United States Patent Office 2,803,416
Patented Aug. 20, 1957

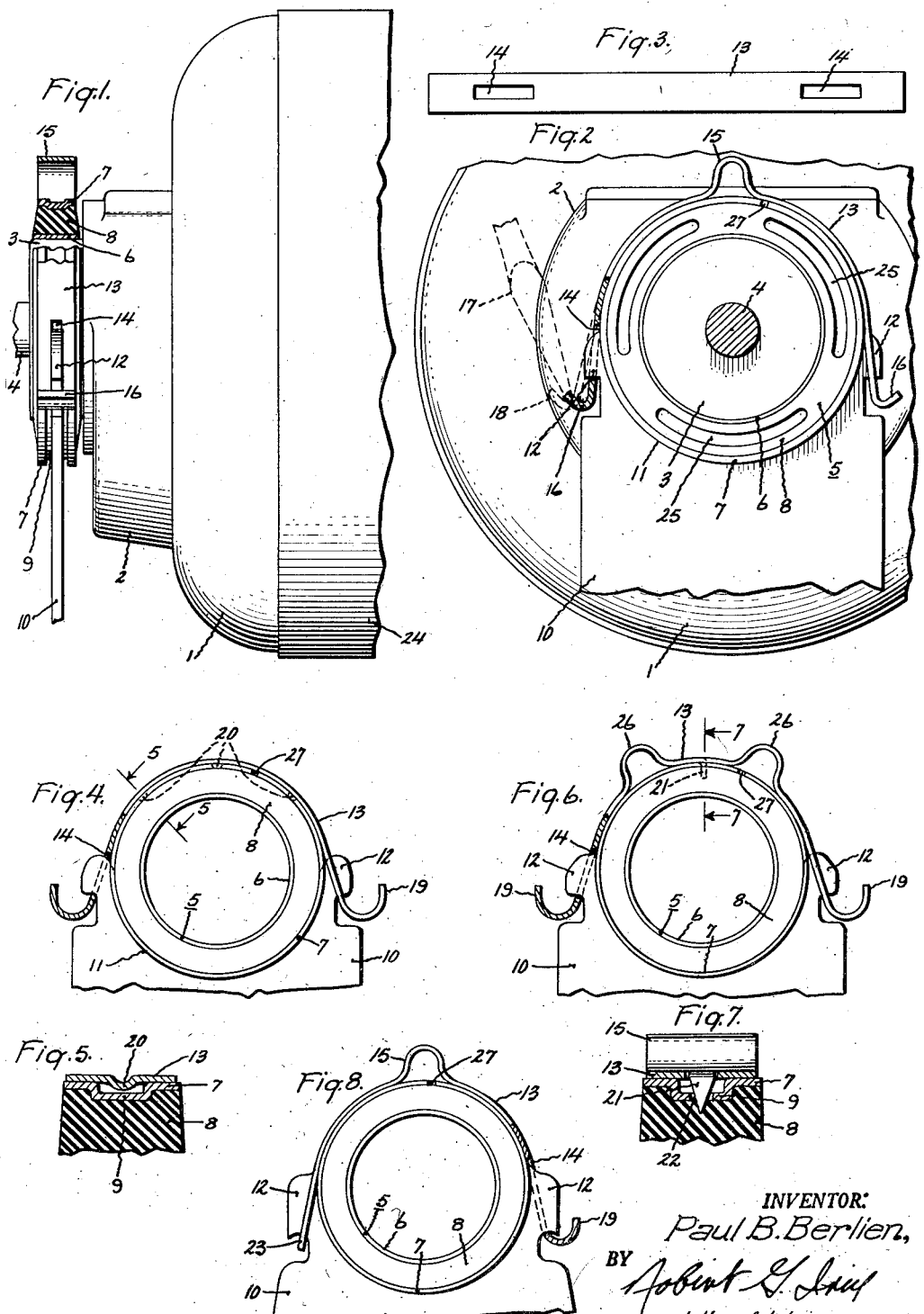

2,803,416

RESILIENT MOUNTING

Paul B. Berlien, Fort Wayne, Ind., assignor to General Electric Company, a corporation of New York Application June 4, 1954, Serial No. 434,630

8 Claims. (Cl. 248—26)

This invention relates to rotating machines, and more particularly to a mounting for resiliently supporting such machines.

The torsional vibrations caused by the operation of rotating machines, such as dynamoelectric machines, can be a source of annoyance and danger unless a mounting is provided so as to resiliently cushion such vibrations. Such mountings, particularly for small dynamoelectric machines, often take the shape of an annulus of resilient material fitted on a hub of a machine, with a base arranged to support the annulus. Such an arrangement is shown, for instance, in Patent 2,074,136 Welch, assigned to the assignee of this application. Where resilient mounting means of this type are provided, it is economically desirable to provide means whereby the resilient mounting may be easily and rapidly assembled on the machine and disassembled therefrom. In addition, the number of component parts of the mounting should be kept to a minimum. These features should, of course, be achieved without any sacrifice of the secureness of the mounting, i. e., the mounting must not be subject to coming off when subjected to axial or torsional bumps. Such features, while providing the desired economy, also must be achieved without losing any of the effectiveness of the mounting.

It is, therefore, an object of this invention to provide improved resilient mounting means which will incorporate the features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention, in one embodiment thereof, includes a resilient mounting formed of an annulus adapted to be mounted over a hub of a rotating machine, the outer part of this annulus being adapted to be seated on a part of the base of the machine. The base is provided with latches so that means may be provided to clamp the mounting means and, consequently, the machine, to the base. The clamp consists of a single piece of material which is formed around part of the outer periphery of the annulus and has openings provided near its ends to fit over the base latches. At least one end of the clamp is turned outwardly to provide a seat for a tool, such as a screw driver for example, whereby the element may be forced down over the latch until it snaps over the latch into position. It is deemed preferable to form at least one portion of the material away from the outer periphery of the ring in order to achieve a desired degree of resilience of the clamping element. The various embodiments show that either one or two of these loops may be provided, or if desired, they may be eliminated entirely. Also, means may be provided extending from the inner surface of the clamping element to prevent either radial or axial movement of the resilient mounting annulus relative to the clamp.

In the drawing, Figure 1 is a fragmentary side view, partly in cross section, of a dynamoelectric machine having the improved mounting means of this invention;

Figure 2 is an end view, partly in cross section, of the resilient mounting clamp;

Figure 3 is a top view of the resilient mounting clamp of this invention before it is shaped;

Figure 4 is an end view of a modification of the improved resilient mounting clamp;

Figure 5 is a fragmentary cross-sectional view along lines 5—5 of Figure 4;

Figure 6 is an end view of another modification of the improved mounting means;

Figure 7 is a fragmentary cross-sectional view along line 7—7 of Figure 6; and

Figure 8 is an end view of yet another modification of the improved mounting means of the invention.

Referring now to Figures 1, 2, and 3 of the drawing, there is shown an end shield 1 of a dynamoelectric machine, generally indicated at 24. At the end of the casing there is provided a bearing housing 2 and from this bearing housing extends a hub portion 3. Shaft 4 of the dynamoelectric machine extends out of hub 3 and may be arranged to either drive or be driven. A resilient mounting member 5, in a form of an annulus, or ring, is provided with an inner metallic band 6, an outer metallic band 7, and an annulus of resilient material 8, such as rubber or neoprene, therebetween and bonded thereto. Band 7 may be split, as at 27, to allow compression of mounting member 5 without permanent deformation of band 7. Annulus 8 is preferably provided with equispaced arcuate axial openings 25, such as those described in Patent 2,178,077—Loftis, assigned to Henrite Products Corporation. Outer band 7 is preferably provided with a peripheral groove 9 to provide a seat for base 10 of the machine. The base 10 has an arcuate recess 11, provided to receive outer band 7, and latch members 12 for a purpose to be hereinafter described. The mounting thus far described is set forth in full detail in the above mentioned Patents 2,074,136 Welch and 2,178,077 Loftis. Mounting ring 5 is arranged over hub 3, as by press fitting, for instance, so that the two are secured together. It will be understood that the apparatus described thus far is illustrative, and that various modifications may be effected without impairing in any way whatsoever the desirability and effectiveness of the apparatus to be described herebelow.

In order to clamp the mounting ring 5 to the base member 10, a clamping element 13, preferably of resilient metal, is provided. As may be seen in Figure 3, this element may be formed from a rectangular strip having a pair of openings 14 punched therein. Strip 13 is formed, as shown, with an inner radius substantially coinciding with the outer radius of ring 7. A portion 15 of the strip is preferably formed as a curved extension away from mounting ring 5 in order to provide the desired degree of resilience. It will be observed that when the strip is so formed and is placed over the mounting ring 5, openings 14 will substantially coincide with latch members 12 of the base 10. The ends of strip 13 are bent upwardly into hooks, as at 16, to provide a seat for a tool, such as a screw driver, as will be explained more fully below. The strip 13 may be placed over the mounting ring 5 so that one of the latch members 12 of the base projects through one of the openings 14 of the strip. The other end of the strip may then be forced down by means of a tool seated in hook 16 until the second latch member 12 snaps through the second opening 14. When this is accomplished strip 13 will be in a position, best shown in Figure 2, whereby it tightly clamps the mounting ring 5 to the base 10 by means of the engagement of latch members 12 through openings 14 respectively.

As shown in dotted outline in Figure 2, the clamping strip 13 may be easily removed by insertion of a tool, such as screw driver 17, into hook 16 of the strip and then prying the end outward to a position shown at 18 where it is disengaged from the latch member 12.

It will be seen from the foregoing that mounting ring 5 may be securely clamped to base 10 by means of a single simply formed element coacting with the ring and the base. It will further be seen that assembly and disassembly of the clamp, the ring, and the base, may be quickly effected by means of a simple tool such as a screw driver in a short period of time.

Referring now to Figures 4 and 5, there will be described a modification of the invention using like numerals for like parts. In this embodiment the hooked ends 19 of strip 13 extend outwardly and upwardly to a considerably greater extent than in the embodiment of Figures 1, 2 and 3. By means of this provision, it is possible to use a tool which is perpendicular to the plane of the mounting ring as well as one which is held in the plane of the mounting ring (as shown in Figure 2). The need for this means of assembling and disassembling the mounting may arise where other parts of the machine make it impractical to hold the tool as in Figure 2. In addition, the strip 13 of Figure 4 is provided with a plurality of indentations 20. As is best seen in Figure 5 these indentations extend down into the groove 9 of outer band 7. It will be seen that such an arrangement provides affirmative means of preventing any axial movement whatsoever of mounting ring 5 on hub 3 of the machine and eliminates any possibility that the ring 5 may come off hub portion 3 because of an axial shock. Furthermore, the portion 15 of Figures 1, 2 and 3 has been eliminated in this embodiment. This may be desirable where the stresses on the mounting are such that the need for contact area between strip 13 and outer band 7 overcomes the need for resilience.

Referring now to Figures 6 and 7, another modification of the invention, again using like numerals for like parts, will be described. It will be seen that the embodiment of Figures 6 and 7 shows a strip 13 with two raised portions 26 for increased resiliency. In addition to the increased resilience obtained by the use of two outstanding portions 26, the mounting ring 5 may be secured against either axial or torsional stresses by means of a tang 21 punched out of the strip 13. Tang 21 may be forced into the resilient annulus 8 through an opening 22 in groove 9 of outer band 7. The engagement of the tang with annulus 8 anchors the annulus to the strip 13 which, in turn, is secured to the base 10 by means of latches 12 and openings 14.

Referring now to Figure 8 of the drawing, yet another modification of the invention will be described, again using like numerals for like parts. In this embodiment, one end of the strip 13 terminates in a portion 23 which is not hooked away from the rest of the strip but is in a straight line therewith. This modification eliminates the necessity for two portions curved up at the ends thereby simplifying the forming of strip 13 and requiring a somewhat smaller length for the strip.

It will be apparent that many modifications other than those shown may be made to this invention insofar as the number of raised portions, the means for preventing axial or radial movement of the mounting ring, and the formation of the ends of strip 13 are concerned. Therefore, while the invention has been explained by describing particular embodiments thereof, it will be apparent that improvements and modifications may be made without departing from the scope of the invention as defined in the appended claims.

What I claim as new and desire to secure by Letters Patent of the United States is:

1. In a rotatable machine having a hub portion, a base having a pair of latch members, a resilient mounting adapted to be secured about the hub portion and arranged on said base between said latch members, and a strip of material having a portion thereof tightly engaging part of the periphery of said mounting, said strip further having a pair of openings provided at each end respectively of said tightly engaging portion, said latch members extending into said openings respectively when said portion and said mounting are in tight engagement, said strip further having an end portion beyond one of said openings shaped as a hook to receive an assembling and disassembling tool.

2. In a rotatable machine having a hub portion, a base having a mounting receiving portion and having latch members respectively provided on each side of said mounting receiving portion, a resilient mounting adapted to be secured about the hub portion on said mounting receiving portion of said base, and a strip of metal having a portion thereof tightly engaging part of the periphery of said mounting opposite said base, said strip further having a pair of openings provided respectively at each end of said tightly engaging portion, said latch members extending into said openings respectively when said portion and said mounting are in tight engagement, said strip having an end portion beyond one of said openings shaped as a hook to provide a seat for an assembling and disassembling tool.

3. In a rotatable machine having a hub portion, a base having a mounting receiving portion and having latch members respectively provided on each side of said mounting receiving portion, a resilient mounting adapted to be secured about the hub portion on said mounting receiving portion of said base, and a strip of metal having a portion thereof tightly engaging the part of the periphery of the mounting opposite said base, said strip further having a pair of openings provided respectively at each end of said tightly engaging strip portion, said latch members extending into said openings respectively when said portion and said mounting are in tight engagement, said strip having the end portions thereof beyond said openings respectively shaped as hooks to provide seats for an assembling and disassembling tool.

4. In a rotatable machine having a hub portion, a base having a mounting receiving portion and having latch members respectively provided on each side of said mounting receiving portion, a resilient mounting adapted to be secured about the hub portion on said mounting receiving portion of said base, and a strip of metal having a portion thereof tightly engaging the parts of the periphery of said mounting opposite said base, said tightly engaging strip portion including a part extending away from said mounting thereby to provide said strip with greater flexibility, said strip further having a pair of openings provided respectively at each end of said tightly engaging strip portion, said latch members extending into said openings respectively when said strip portion and said mounting are in tight engagement, said strip having an end portion beyond one of said openings shaped as a hook to provide a seat for an assembling and disassembling tool.

5. In a rotatable machine having a hub portion, a base having a mounting receiving portion and having latch members respectively provided on each side of said mounting receiving portion, a resilient mounting adapted to be secured about the hub portion on said mounting receiving portion of said base, and a strip of metal having a portion thereof in tight engagement with parts of the periphery of said mounting opposite said base, said tightly engaging strip portion including a part extending away from said mounting thereby to provide said strip with greater flexibility, said strip further having a pair of openings provided respectively at each end of said tightly engaging strip portion, said latch members extending into said openings respectively when said strip portion and said mounting are in tight engagement, said strip having an end portion beyond one of said openings shaped as a hook to provide a seat for an assembling and disassembling tool, and having its other end portion terminating a relatively short distance beyond the other of said openings.

6. In a rotatable machine having a hub portion, a base having a mounting receiving portion and having latch members respectively provided on each side of said mounting receiving portion, a resilient annular mounting adapted to be secured about the hub portion on said mounting receiving portion of said base, and a strip of metal having portions thereof tightly engaging part of the periphery of said mounting opposite said base, parts of said strip located between said strip portions being curvedly extended away from said mounting thereby to provide said strip with greater flexibility, one of said strip portions having a tang extending therefrom into said mounting, said strip having a pair of openings provided respectively adjacent each end thereof, said latch members extending into said openings respectively when said strip portions and said mounting are in tight engagement, said strip having an end portion beyond one of said openings shaped as a hook to provide a seat for an assembling and disassembling tool.

7. In a rotatable machine having a hub portion, a base having a mounting receiving portion and having latch members respectively provided on each side of said mounting receiving portion, a resilient annular mounting having an outer metallic ring with a peripheral groove therein adapted to be secured about the hub portion on said mounting receiving portion of said base, and a strip of metal having portions thereof tightly engaging said outer ring opposite said base, said strip portions having indentations protruding into said peripheral groove, a part of said strip located between said strip portions curvedly extended away from said mounting thereby to provide said strip with greater flexibility, said strip having a pair of openings provided respectively adjacent each end thereof, said latch members extending into said openings respectively when said portion and said mounting are in tight engagement, said strip having an end portion beyond one of said openings shaped as a hook to provide a seat for an assembling and disassembling tool.

8. In a rotatable machine having a hub portion, a base having a mounting receiving portion and having latch members respectively provided on each side of said mounting receiving portion, a resilient annular mounting adapted to be secured about the hub portion on said mounting receiving portion of said base, and a strip of metal having portions thereof tightly engaging the periphery of said mounting opposite said base, a part of said strip located between said strip portions being curvedly extended away from said mounting thereby to provide said strip with greater flexibility, said strip having a pair of slots substantially the same width as said latch members provided respectively adjacent the ends of said strip, said latch members extending into said slots respectively when said strip portions and said mounting are in tight engagement, said strip having the end portions beyond said openings respectively shaped as hooks to provide seats for an assembling and disassembling tool.

References Cited in the file of this patent

UNITED STATES PATENTS

| | | |
|---|---|---|
| 1,114,123 | Dalton | Oct. 20, 1914 |
| 1,297,995 | Bralove | Mar. 25, 1919 |
| 1,849,360 | Brandt | Mar. 15, 1932 |
| 1,851,973 | Brandt | Apr. 5, 1932 |
| 2,057,370 | Dehlendorf et al. | Oct. 13, 1936 |
| 2,074,136 | Welch | Mar. 16, 1937 |
| 2,136,125 | DeLaval-Crow | Nov. 8, 1938 |
| 2,226,098 | Hedstrom | Dec. 24, 1940 |
| 2,282,174 | Else et al. | May 5, 1942 |
| 2,296,221 | Pontis | Sept. 15, 1942 |
| 2,363,474 | Schlesinger | Nov. 21, 1944 |
| 2,505,775 | Hubbell | May 2, 1950 |
| 2,576,298 | Kessler | Nov. 27, 1951 |
| 2,598,836 | Scheele | June 3, 1952 |

FOREIGN PATENTS

| | | |
|---|---|---|
| 244,671 | Switzerland | Sept. 30, 1946 |
| 459,970 | Italy | Oct. 11, 1950 |